United States Patent

Asada

[11] Patent Number: 5,450,212
[45] Date of Patent: Sep. 12, 1995

[54] IMAGE FORMING APPARATUS AND METHOD

[75] Inventor: Kenichirou Asada, Tokyo, Japan

[73] Assignee: Ricoh Company, Ltd., Tokyo, Japan

[21] Appl. No.: 366,425

[22] Filed: Dec. 29, 1994

Related U.S. Application Data

[63] Continuation of Ser. No. 868,093, Apr. 14, 1992, abandoned.

[30] Foreign Application Priority Data

Apr. 16, 1991 [JP] Japan ................................ 3-109614

[51] Int. Cl.$^6$ .............................................. H04N 1/04
[52] U.S. Cl. .................................... 358/445; 358/298; 358/458
[58] Field of Search ............... 358/445, 172, 458, 298, 358/456, 283, 171, 173, 168, 461, 457, 80, 471, 174, 429, 182, 183, 261.1; 377/45; 382/56, 54, 27, 51, 34; 340/793, 814, 717, 721, 703, 799; 341/141, 143, 172, 131, 118, 139

[56] References Cited

U.S. PATENT DOCUMENTS

| | | | |
|---|---|---|---|
| 4,689,482 | 8/1987 | Horikawa et al. | |
| 4,856,011 | 8/1989 | Shimada et al. | |
| 4,926,268 | 5/1990 | Kawamura et al. | 358/458 |
| 5,003,564 | 3/1991 | Fling | 358/172 |
| 5,056,154 | 10/1991 | Aono et al. | 358/429 |
| 5,059,962 | 10/1991 | Sekiya et al. | 340/793 |
| 5,091,971 | 2/1992 | Ward et al. | 358/461 |
| 5,126,761 | 6/1992 | Asada | |
| 5,130,808 | 7/1992 | Kemmochi | 358/298 |
| 5,164,726 | 11/1992 | Bernstein et al. | 358/174 |
| 5,248,971 | 9/1993 | Mandl | 341/141 |
| 5,250,948 | 10/1993 | Berstein et al. | 341/131 |
| 5,258,747 | 11/1993 | Oda et al. | 358/182 |
| 5,264,942 | 11/1993 | Shimotsuji et al. | 358/261.1 |
| 5,309,156 | 5/1994 | Fujiyama | 341/67 |
| 5,313,412 | 5/1994 | Nukui | 364/724.16 |

FOREIGN PATENT DOCUMENTS

| | | |
|---|---|---|
| 62-49781 | 3/1987 | Japan. |
| 2-192966 | 7/1990 | Japan. |

Primary Examiner—Paul Ip
Attorney, Agent, or Firm—Popham, Haik, Schnobrich & Kaufman, Ltd.

[57] ABSTRACT

An image forming apparatus comprises an image signal converting means. The image converting means converts a first image signal into a second image signal. The first image signal includes an n-bit digital signal indicating a tone level of an image. The second image signal includes an m-bit digital signal indicating the tone level of the image. Here, m and n are integers and m is greater than n. A predetermined relationship between $2^n$ values expressible by the n-bit digital signal and $2^n$ related values among $2^m$ values expressible by the m-bit digital signal is according to a first image forming characteristic in the image forming apparatus. The image forming apparatus further comprises an image forming means having a second image forming characteristic. The image forming means is coupled to the image signal converting means and forms the image based on the second image signal related to a combination of the first and second image forming characteristics.

10 Claims, 9 Drawing Sheets

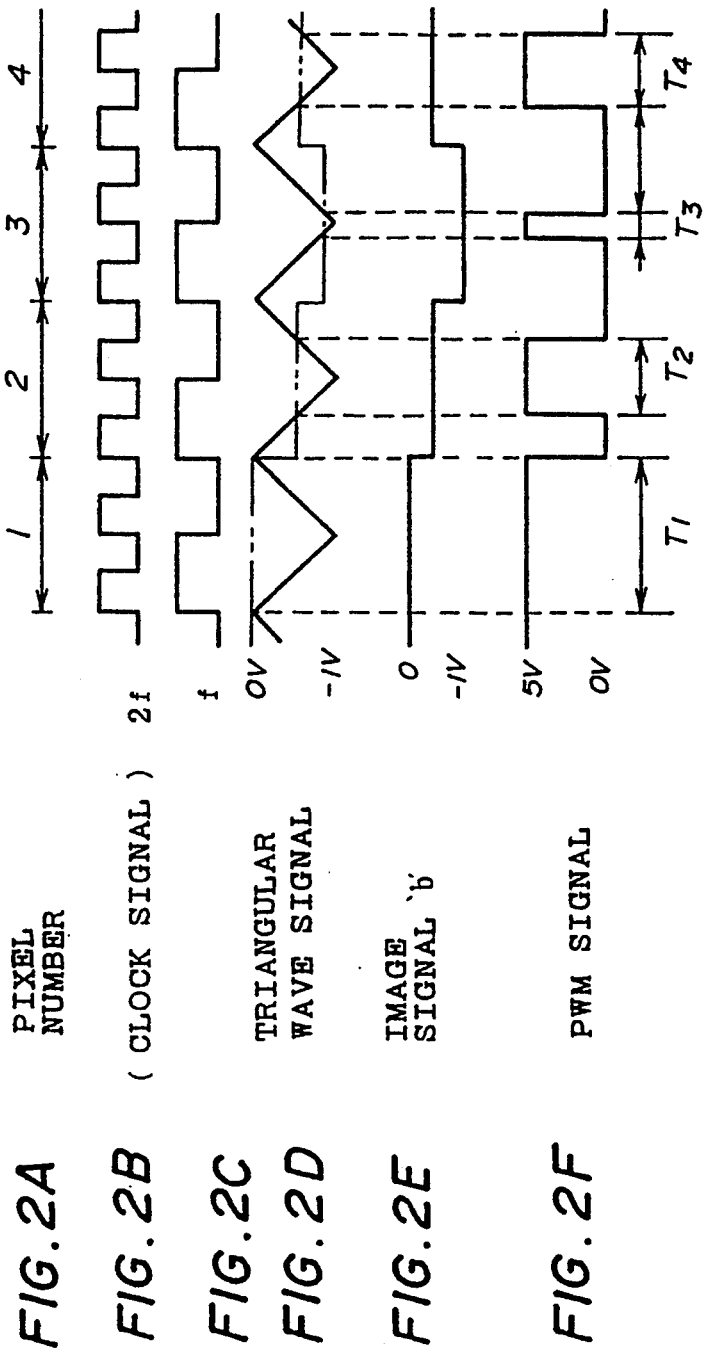

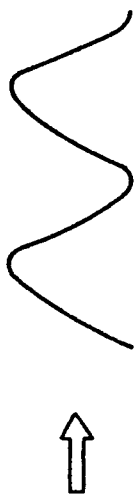
FIG.3A IDEAL REFERENCE WAVE
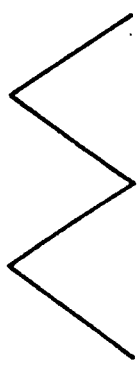
FIG.3B EXAMPLE OF ACTUAL REFERENCE WAVE
(TRIANGULAR WAVE WITH OBTUSED VERTEXES AND DISTORTED LINES)

IMAGE FORMING APPARATUS AND METHOD

This is a continuation of U.S. patent application Ser. No. 07/868,093, filed Apr. 14, 1992, now abandoned.

BACKGROUND OF THE INVENTION

The present invention relates to an image forming apparatus, such as a laser printer, laser duplicator, laser facsimile, and the like, which forms images having a halftone by means of multiple-value image data, and to a method therefor. The multi-value image data is such data that 256 levels from "00H" to "FFH" ('H' means hexadecimal number, that will be the same as hereinafter) are allocated to halftone levels from white to black.

Recently, as a high speed low noise printer, a laser beam printer using an electronic photo method has drawn the attention of the public. The laser beam printer is utilized mainly for forming a two value image, having only two tones (white and black), such as letters, line drawings, figures, and the like. In this printer, normally a halftone image is not treated. Therefore, the construction of the printer or image processing circuits of the printer can be simplified. Also, by utilizing this two value printer, a halftone image can be formed by means of the known Dizzer method or Dot pattern method.

However, by utilizing the two value printer using the dither method or Dot pattern method, a halftone image having a high resolution can not be formed. Recently, a printer forming a halftone image by utilizing the two value printing method has been developed. In this printer, an image signal is modulated in a pulse width modulation(PWM) manner, and then a laser is driven by the modulated image signal. This printer using the PWM method can be effectively used for forming color images.

Japanese Laid-Open Patent Application No. 2-192966 discloses one example of a PWM(pulse width modulation) circuit in such a conventional image forming apparatus. The composition of the circuit and main signals thereof are shown in FIG. 1 and FIGS. 2A to 2F respectively. In FIG. 1 and FIGS. 2A to 2F, a 8-bit parallel image signal 'a' having a transistor transistor logic(TTL) level is latched by TTL latch circuit 101. Subsequently, this signal 'a' is then converted into a signal having an emitter coupled logic(ECL) level by a level converter 102. Subsequently, the image signal having an ECL level is then converted into an analogue signal 'b' by ECL D/A(Digital/Analogue) converter 103. Further, this signal 'b' is supplied to one input terminal of a ECL comparator 104.

A clock oscillator(OSC) 106 generates clock signal($2f$) having a frequency of $2f$. A triangular wave signal generator 107 generates a generally ideal triangular wave signal(pattern signal having the same pattern as each other per each period) serving as a reference signal in synchronization with the clock signal($2f$). This triangular wave signal is supplied to the other input terminal of the ECL comparator 104. ½ frequency divider 108 divides this clock signal $2f$ into half. Further, the ½ frequency divider 108 supplies an image clock signal (f) having a frequency f and a duty ratio of 50% to the TTL latch circuit 101. The TTL latch circuit 101 latches the parallel image signal 'a' in synchronization with this image clock signal(f). Therefore, both of a period of the image clock signal(f) shown in FIG. 2C and a period of the triangular wave signal shown in FIG. 2D are synchronized with a period of each pixel shown in FIG. 2A.

ECL comparator 104 supplies a PWM signal having an ECL level corresponding to a signal level differential between the analogue signal 'b' converted by the D/A converter 103 and the triangular wave signal supplied by the triangular wave signal generator 107. A level converter 105 converts the ECL level of the PWM signal into the TTL level. A laser driver circuit 109 turns a laser diode 110 on and off, which diode emits light to a photosensitive drum corresponding to a pulse width of the PWM signal. Thus, an electrostatic latent image is formed on the photosensitive drum.

However, in the above mentioned conventional image forming apparatus, an image forming speed depends on the frequency 'f'. Therefore, the frequency 'f' has to be increased to increase the image forming speed. For example, if the frequency 'f' is set at 5 MHz, the shared time for one pixel becomes not more than 200 nsec. Forming an ideal triangular wave, such as that shown in FIG. 3A, in such a short period is difficult. In addition, forming the triangular wave in such a short period results in distortion of the triangular wave increasing, as shown in FIG. 3B.

A characteristic of a pulse width of the PWM signal corresponding to an input image signal 'a' is defined in relation to a waveform of utilized reference signals, as will be described below. In a case where an ideal reference signal, such as that shown in FIG. 3A, is utilized, a pulse width varies linearly, as is indicated by a broken line in FIG. 4. In a case where a distorted reference signal, such as that shown in FIG. 3B, is utilized, a pulse width does not vary linearly, as is indicated by solid line in FIG. 4. Further, in an image forming apparatus utilizing an electrical photo processing method, an image tone level corresponding to a pulse width of the PWM signal does not vary linearly, as is indicated by a line in FIG. 5, due to characteristics of an image tone level forming means. To correct such a characteristic shown in FIG. 5, which is not linear, a characteristic curve for converting an input image signal into the PWM signal should be set as shown in FIG. 6 beforehand.

Further, in Japanese Laid-Open Patent Application No. 62-49781, a method for varying a period of a pulse signal corresponding to a letter image and photo image without varying the amplitude nor bias thereof has been proposed. However, even if this method is utilized, due to an increase in the image forming speed, a reference signal having a desired shaped wave cannot be produced.

SUMMARY OF THE INVENTION

In consideration of the above mentioned problems of the conventional method, a general object of the present invention is to provide an image forming apparatus or method wherein an image forming characteristic corresponding to an input image signal will be improved even if processing thereof is carried at a high speed.

Another and more specific object of the present invention is to provide an image forming apparatus or method wherein a characteristic curve of a printed image tone level corresponding to an input image signal is linear.

A further specific object of the present invention is to provide an image forming apparatus or method wherein a certain distortion included in a printed image tone characteristic curve corresponding to an input image signal is cancelled, this distortion occurring in a printed image tone forming means and to on.

The above mentioned object of the present invention can be achieved by an image forming apparatus or method comprising an image signal converting means for converting an input image signal (serving as a first image signal) including an n-bit digital signal indicating a tone level of an image into a second image signal including an m-bit digital signal indicating the tone level of the image, where m and n are integers and m is greater than n, a predetermined relationship between $2^n$ values expressible by the n-bit digital signal and $2^n$ related values among $2^m$ values expressible by the m-bit digital signal being according to a first image forming characteristic, and the printed image tone forming means and so on(serving as an image forming means) having a second image forming characteristic, coupled to said image signal converting means, for forming an image based on said second image signal related to a combination of the said first and second image forming characteristics.

According to the present invention, the first image forming characteristic will be determined so as to cancel a certain distortion included in the second image forming characteristic of the printed image tone forming means and so on. Thus, an overall image tone characteristic curve corresponding to the input image signal in the image signal converting means and the printed image tone forming means and so on is linear. Also, the image converting means can perform a converting function in the desired first image forming characteristic by means of such a simple composition to make an input digital signal correspond to an output digital signal by using bits.

A further object of the present invention is to provide an image forming apparatus or method wherein examination of a distortion included in an image forming characteristic and a changing of a distortion correction means when some components in the printed image tone forming means and so on are changed is simplified.

The above mentioned object of the present invention can be achieved by an image forming apparatus or method wherein an image signal converting means is provided only for correcting a distortion regarding, for example, a pulse generating means and/or an image forming means, and not provided for correcting a distortion regarding, for example, an image reading means and/or an image signal processing means. In this case, a distortion regarding the image reading means and/or the image signal processing means is corrected by a certain function of the signal processing means. That is, the system for correcting distortions is separated into two parts.

Accordingly, for the purpose of examining a distortion or changing a distortion correction means when some components of, for example, the image forming means are changed, it is not necessary to be concerned about, in this case, the image reading means and the signal processing means, because they are in separate parts of the system. Thus, such examination or changing is simplified.

Other objects and further features of the present invention will become more apparent from the following detailed description when read in conjunction with the accompanying drawings.

BRIEF DESCRIPTION OF THE DRAWINGS

FIGS. 2A to 2F are timing charts showing main signals utilized in the conventional apparatus or the apparatus according to the present invention respectively;

FIGS. 3A and 3B each shows a waveform of a triangular wave signal shown in FIG. 2D;

DESCRIPTION OF THE PREFERRED EMBODIMENT

Figure 7:
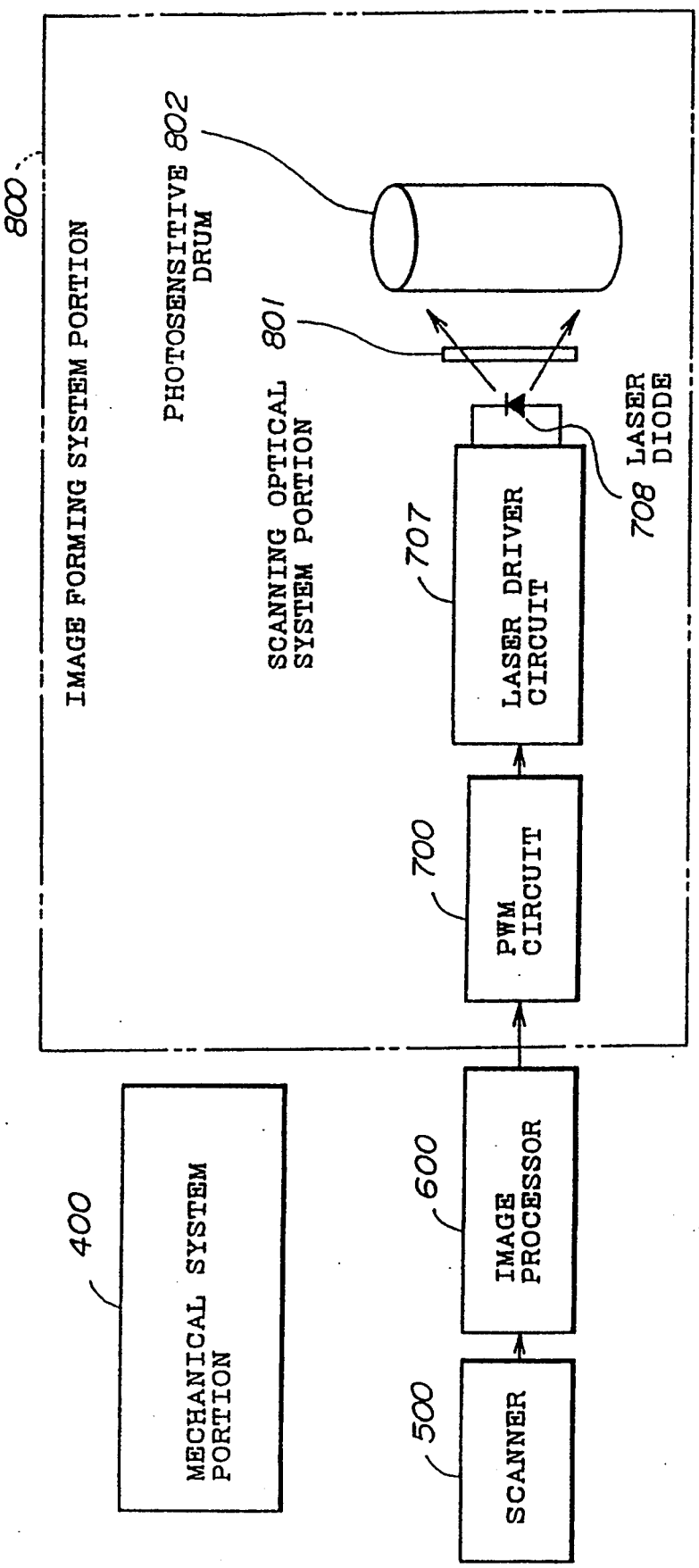
FIG. 7 is a block diagram of important portions of a duplicator according to the present invention.

FIG. 7 shows a block diagram of essential portions of a duplicator according to one embodiment of the present invention. The composition of the blocks shown in this drawing is similar to conventional duplicators. In a duplicator, generally indicated by reference numeral 1 in the drawing, a mechanical system portion 400 operates to move a scanner, feed papers, and so on. An original image to be duplicated is read in by a scanner 500, then it is supplied by the scanner 500 as an image signal to an image processor 600. The image signal is then processed by the image processor 600 according to the prescribed methods. These prescribed methods are known color correction, $\gamma$ correction, tone processing, and so on. The image signal thus processed thereby is then supplied to a PWM circuit 700.

Figure 8:
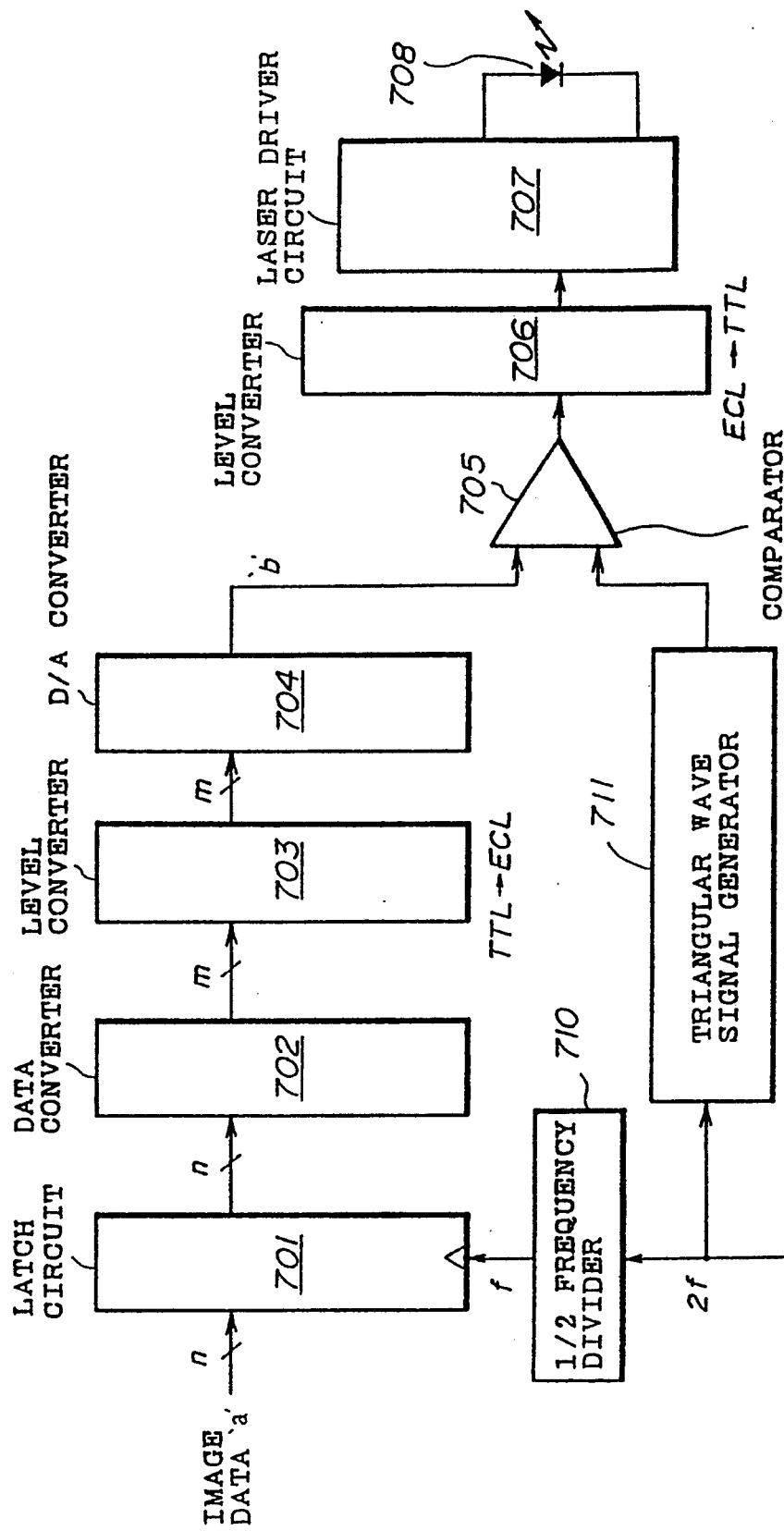
FIG. 8 is a block diagram of important portions of an image forming system portion shown in FIG. 7.
Figure 9:
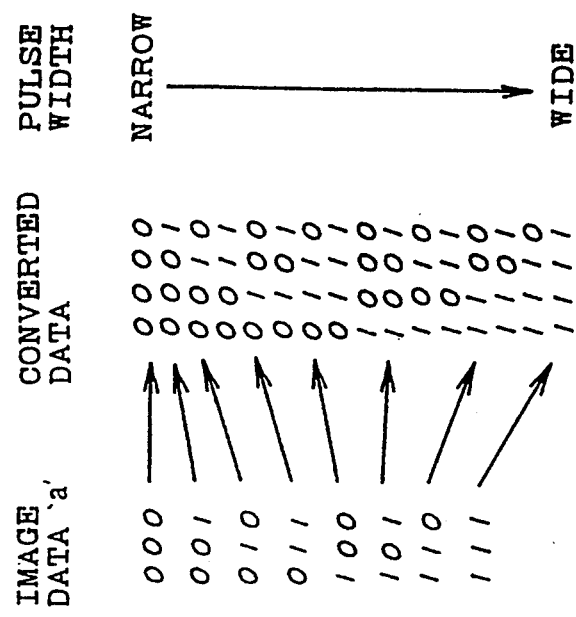
FIG. 9 illustrates one example of a conversion table of a data converter shown in FIG. 8.

FIG. 8 shows a block diagram of essential portions of an image forming system portion 800. FIG. 9 shows one example of a conversion table of a data converter, which converter is the most essential portion of the present invention.

In FIG. 8, parallel image signal 'a' having n bits at a TTL level is latched by TTL latch circuit 701. subsequently, this signal 'a' is converted into a multiple value image signal having m($\geq$n) bits by data converter 702. The purpose of this conversion is to make a printed image tone characteristic corresponding to this multiple value image signal 'a' linear. The data converter 702 has the table for converting the input image signal having n bits into another image signal having m bits. FIG. 9 shows one example of the table by which the input image signal having 3(=n) bits is converted into another signal having 4(=m) bits.

Figure 1:
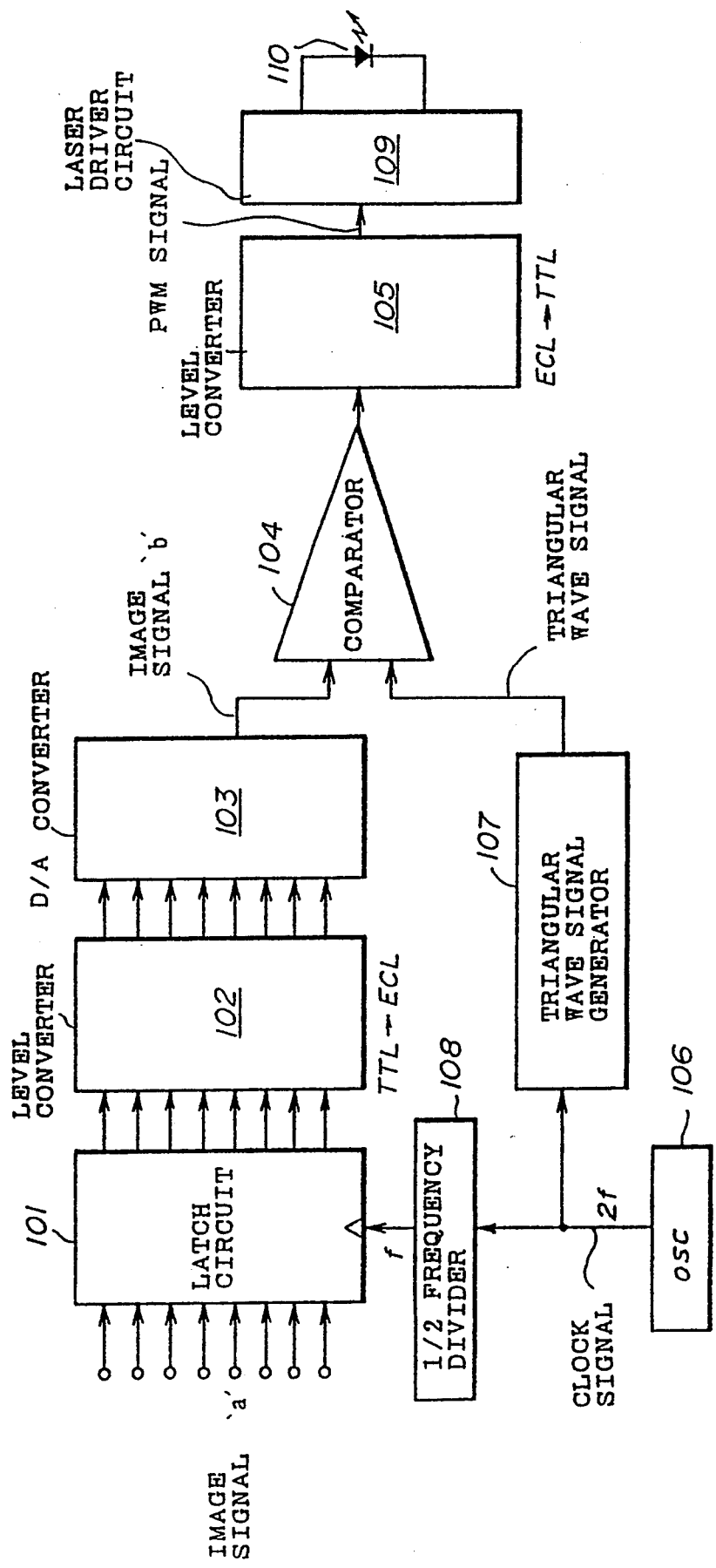
FIG. 1 is a block diagram showing important portions of a conventional image forming apparatus.
Figure 4:
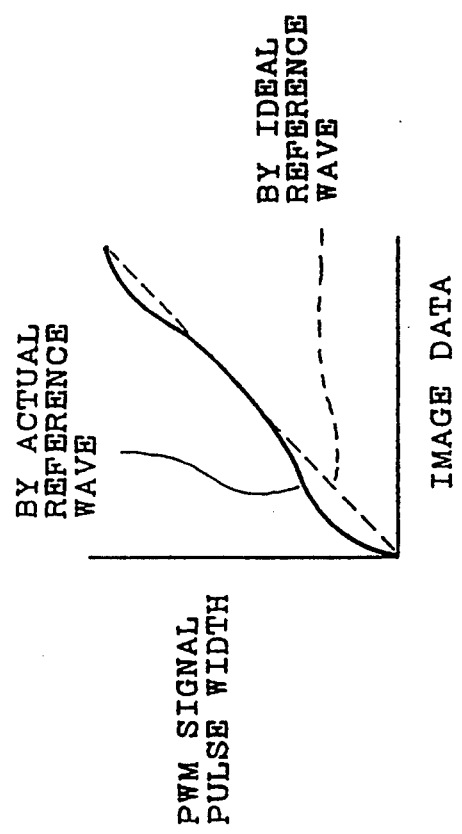
FIG. 4 is a graph showing a characteristic of a pulse width of a PWM signal corresponding to input image data in the conventional apparatus or the apparatus according to the present invention.
Figure 5:
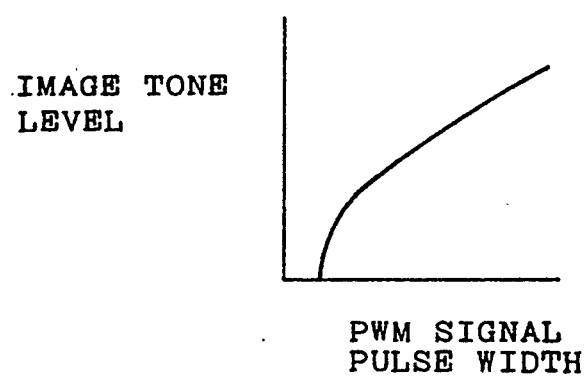
FIG. 5 is a graph showing a characteristic of a printed image tone corresponding to a pulse width of a PWM signal in the conventional apparatus or the apparatus according to the present invention.

A relation between the input image signal 'a' and the converted signal will now be described below. Due to the distortion in the triangular wave signal shown in FIG. 3B, a characteristic of converting from the image data to a pulse width of the supplied PWM signal, has a distortion shown by the solid line in FIG. 4. Further, the printed image tone characteristic corresponding to the pulse width of the supplied PWM signal is not linear, as is shown in FIG. 5. That is, a printed image tone proportional to the pulse width of the PWM signal cannot be supplied due to the characteristics of a image tone forming means, that is, the system comprising the laser driver circuit 707, the scanning optical system portion 801 and the photosensitive drum 802. Here, the tone of the printed image is realized by developing material such as toner adhered onto the duplicated document paper finally.

To correct this distortion of linearity, the characteristic curve of converting from the input image data to the pulse width of the supplied PWM signal has to be made different from linear intentionally. That is, the characteristic curve of converting as mentioned above has to be that shown in FIG. 6 so that the distortion will be cancelled. Thus, in this case, the conversion table of converting from the input image data into the pulse width of the converted PWM signal are made to correspond to the characteristic curve shown in FIG. 6 as shown in FIG. 9 so that the printed image tone characteristic curve for the input image signal becomes linear.

In the table of FIG. 9, in a position where the value of the input image 'a' is small, the characteristic of converting is such that a distance between each of the adjacent values of the converted data is wide, while, in a position where the value of the input image 'a' is large, a distance between each of the adjacent values of the converted data is narrow. In this manner, this characteristic of converting is made to correspond to those of FIG. 6.

The reason why the characteristic of converting of the conversion table of FIG. 9 as mentioned above can be realized will be explained below. As compared with the bit number 3 of the input data 'a', the bit number 4 of the supplied converted data is relatively big. In this case, increasing the number of bits through the conversion results in increasing the possible number of data which will be made by combining a value '0' or '1' of the bits. For example, the number of data made of 3 bits is $2^3=8$, while the number of data made of 4 bits is $2^4=16$, as shown in FIG. 9. Thus, by increasing the possible number of data made through the conversion, fine correction of the distortion in the characteristic can be performed.

For example, if both the image data and the converted data therefrom are made of 3 bits, the following phenomena will occur. That is, for example, both data "000" and "001" among the image data 'a' will be converted into "000", or such data will be converted into "000" and "001", respectively. In the former case, even if a certain tone difference exists between "000" and "001" of the image data 'a', this tone differential will be disregarded in this conversion. In the later case, no correction of the characteristic is performed.

Referring again to FIG. 8, the multiple value signal, having m bits as a result of its conversion by the data converter 702, is converted into the signal having the emitter coupled logic(ECL) level by a level converter 703. Subsequently, this image signal having the ECL level is converted into analogue signal 'b' by an ECL D/A converter 704. Then, this signal 'b' is supplied into one input terminal of an ECL comparator 705.

A clock generator 709 generates a clock signal($2f$) having a frequency $2f$ thereof as shown in FIG. 2B. A triangular wave signal generator 711 generates a generally ideal triangular wave having a frequency f in synchronization with the clock signal($2f$). This triangular wave signal is supplied into the other terminal of the ECL comparator 705. A ½ frequency divider 710 divides this frequency $2f$ of the clock signal($2f$) into the frequency f, then a pixel clock signal(f), having the frequency f as a result of this frequency dividing and a duty ratio of 50%, is supplied into the TTL latch circuit 701. The TTL latch circuit 701 latches the image signal 'a' in synchronization with this pixel clock signal(f). In this manner, both the periods of the clock signal(f) shown in FIG. 2C and that of the triangular wave signal shown in FIG. 2D are respectively made be synchronized with the period which each of the pixels(image signal 'a') has.

The ECL comparator 705 supplies a PWM signal having an ECL level in response to the result of the comparison of the level of the analogue signal 'b' converted by the D/A converter 704 with the triangular wave signal generated by the triangular wave generator 711. A chain double dashed line overlapping the triangular wave signal shown in FIG. 2D indicates the same line as the image signal 'b' shown in FIG. 2E. Here, when the level of the signal 'b' is higher than the level of the triangular wave signal, the PWM signal will be at a high level as shown in FIG. 2F, while the PWM signal will be at a low level in the reverse condition.

In this manner, in response to the level of the signal 'b' shown in FIG. 2E, pulse widths from $T_1$ to $T_4$ of the signal shown in FIG. 2F corresponding to the pixel numbers 1 to 4 in FIG. 2A, respectively, are determined. During the period of these pulse widths $T_1$ to $T_4$, the laser driver circuit 707 makes the laser diode 708 emit light onto a photosensitive drum 802. Increasing the level of the image signal 'b' shown in FIG. 2E results in the increasing the pulse width of the PWM signal shown in FIG. 2F, the increasing of the period when the laser diode emits light, and the increasing of an amount of toner adhered on the area of the duplicated document paper corresponding to the pixel number shown in FIG. 2A. Finally, printed image tone of the area is increased by the toner.

The level converter 706 converts the ECL level of the PWM signal to the TTL level. The laser driver circuit 707 turns the laser diode 708 on and off in response to the pulse widths of the PWM signal as mentioned above. Further, by means of the scanning optical system portion 801, the laser beam is emitted onto the required area of the photosensitive drum 802 by scanning. In this manner, an electrostatic latent image corresponding to the image signal 'a' is formed on the periphery of the photosensitive drum 802. Further, after toner is placed on the drum 802 by the electrostatic effect, a paper, to be transferred with the image thereon, is rolled on the drum 802, toner is adhered on the paper in correspondence to this electrostatic latent image, and then the image is transferred to the paper.

Figure 10B:
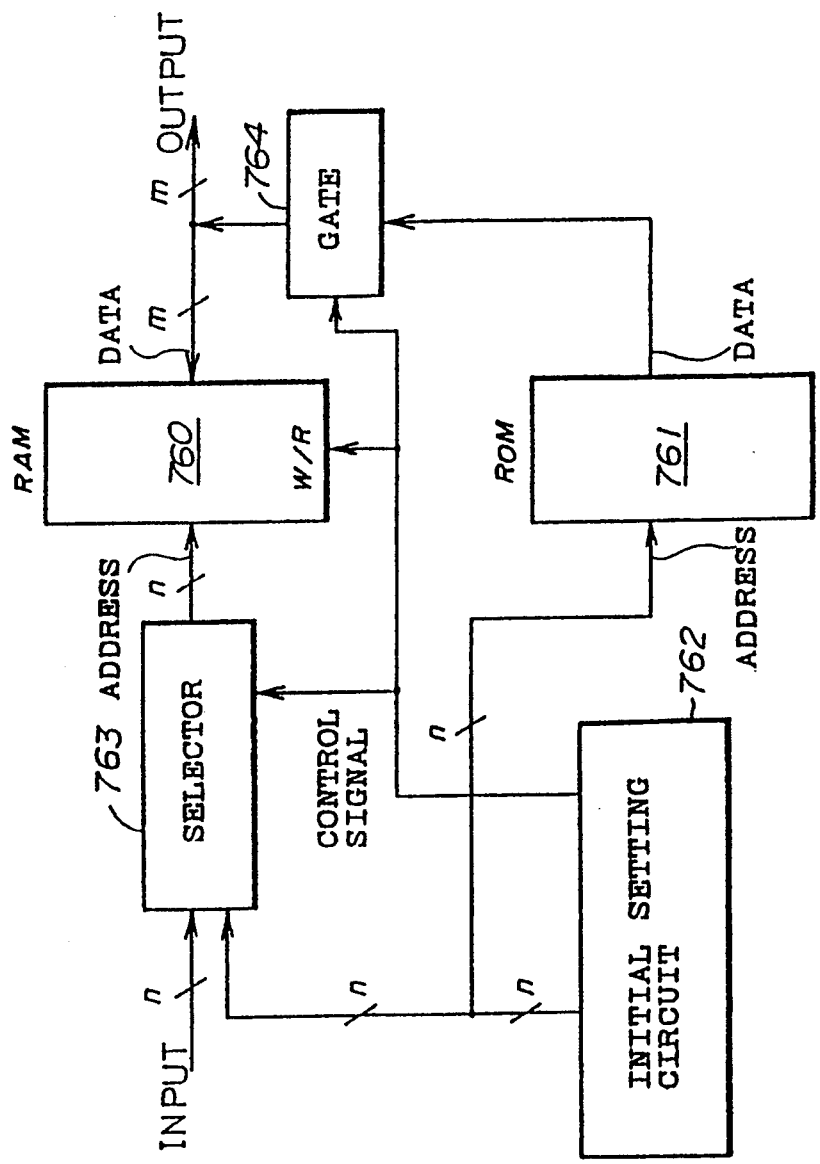
FIGS. 10A, 10B each shows an example of a composition of the data converter shown in FIG. 8.
Figure 10A:
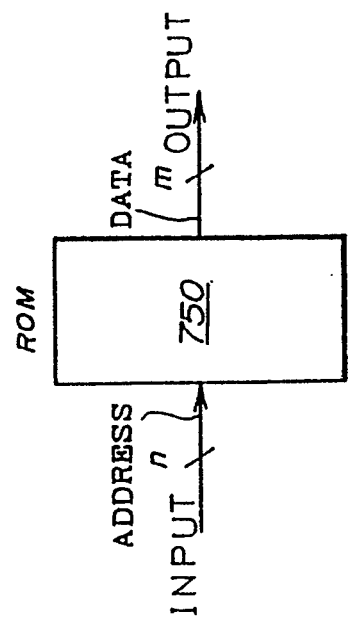

FIG. 10A, 10B show examples of the composition of the data converter 702 shown in FIG. 8. In the example of FIG. 10A, a ROM(Read Only Memory) 750 is utilized. The conversion table, for example, the table shown in FIG. 9, is stored in the ROM 750. In the example of the table shown in FIG. 9, the image data having 3 bits and the converted data having 4 bits correspond to address to be stored with data thereon and data to be stored in the corresponding an address of the ROM 750, respectively.

On the other hand, in FIG. 10B, a RAM(Random Access Memory) 760, such as a static RAM or the like, is utilized instead of a ROM. Regarding a RAM, because an access time thereof is relatively short in contrast to that of a ROM, a RAM is suitable for high speed data processing.

However, in contrast to a ROM, the memorized data in a RAM cannot be kept unless power is supplied thereto. In the example of FIG. 10A, a data conversion table, for example, the table shown in FIG. 9, is stored in a ROM 761, which can keep the stored data therein without power being supplied thereto.

First, when the power has been supplied into the circuit of FIG. 10B, the contents of the conversion table, in this case, the table of FIG. 9, stored in the ROM 761, will be written into the RAM 760 by means of prescribed functions of an initial setting circuit 762. After this data is written into the RAM 760, it will not become volatile until the power supplied to the RAM 760 is stopped.

Subsequently, an operation regarding the circuit shown in FIG. 10B, which will be described below, is performed. First, the operation regarding the initial setting will be described. The initial setting circuit 762 supplies control signals to a selector 763, the RAM 760 and a gate 764 respectively. By means of these control signals supplied thereto, the above elements are instructed to do the following. The selector 763 is instructed to select an address, which has been supplied by the initial setting circuit 762, and then to supply it to the RAM 760. That is, the selector 763 is instructed to permit the address signal to be passed through it to the RAM 760, which signal has been supplied to the selector 763 by the initial setting circuit 762. The RAM 761 is instructed to be written the supplied data thereto in the address supplied at the same time as the data is supplied. Further, the gate 764 is instructed to open.

Then, the initial setting circuit 762 begins to supply all addresses one by one in sequence into the selector 763 and the ROM 761 respectively at the same time, which addresses being corresponding to the data stored in the ROM 761. These addresses correspond to the 8 data of 1("000") to 8("111") shown in the table of FIG. 9. A signal having the addresses then is passed through the selector 763 to the RAM 760. At the same time, the RAM 760, having received this address signal, supplies the data, stored in the address designated by the address signal, to the gate 764. The gate 764 permits the data to be passed through it, which data has been supplied by the ROM 761 to RAM 760. Further, the RAM 760 is written the data, which has been passed through the gate 764 in sequence, in the address designated by the address signal passed through the selector 763. In this manner, all of the data stored in the ROM 761 are written in the RAM 760 in the same addresses thereof as those of the ROM 761.

Subsequently, the operation for converting the data supplied from the latch circuit 701 shown in FIG. 8 is performed. The initial setting circuit 762 supplies control signals to the selector 763, the RAM 760 and the gate 764 respectively. By means of the control signals, the above elements are instructed to do the following. The selector 763 is instructed to select the address supplied by the latch circuit 701, and then to supply it to the RAM 760. That is, the selector 763 is instructed to permit the address signal to be passed through it into the RAM 760, which address signal is supplied to the selector 763 by the latch circuit 701. The RAM 760 is instructed to supply the data by reading it from the address designated by the address signal passed through the selector 763. Further, the gate 764 is instructed to close.

In this manner, the RAM 760 is separated from the ROM 761, and the RAM 760 converts in the data converter 702 the image signal 'a' having n bits supplied by the latch circuit 701 into the data corresponding to data having m bits.

Further, in FIG. 10B, instead of providing the initial setting circuit 762, CPU(Central Processing Unit), not shown in the drawings, included in the image processor 600 shown in FIG. 7 may be utilized for writing data corresponding to the conversion table shown in FIG. 9 into RAM 760 to as to omit the initial setting circuit 762.

Figure 6:
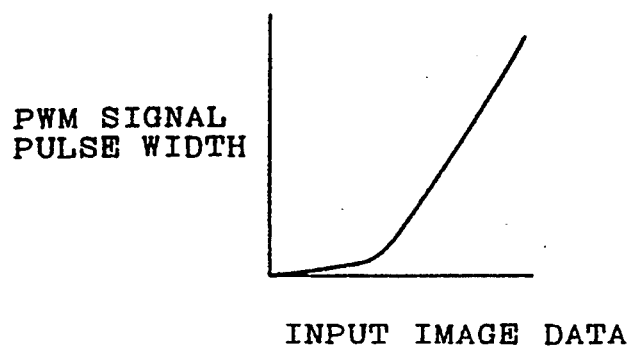
FIG. 6 is a graph showing a characteristic of a pulse width of a PWM signal corresponding to input image data in the data converter according to the present invention.

By means of the above mentioned conversion in the data converter 702, the distortion of triangular wave signal shown in FIG. 3B and the distortion of linearity of the characteristic curve of converting from the pulse wave of the PWM signal into the printed image tone shown in FIG. 5 and other similar distortions which obstruct a precise reproduction of the original image tone are corrected. For example, the characteristic curve of converting from the input image data into the pulse width of the PWM signal is as shown in FIG. 6, so that the characteristic curve of converting from the multiple image signal into the printed image tone is linear. This characteristic curve of converting is provided by the data converter 702 in which, as mentioned above, the n bits of the image signal are converted into $m(\geq n)$ bits of the image signal. This data converter 702 can be constructed at a low cost by using the simple composition shown in FIGS. 10A, 10B. Especially by utilizing the composition shown in FIG. 10B, a higher data processing speed can be obtained, and thus a higher speed image forming process without any distortion which obstructs the precise reproduction of the original image tone will result.

In the above mentioned embodiment, the TTL level is converted into the ECL level and the ECL level is converted into the TTL level, so that high speed data processing at the ECL level can be performed. However, the level converters 703, 706, and so on for such level conversions as that where the TTL level is converted to the ECL level and vice versa may be omitted in a case where high speed data processing is not always desired.

Further, even if high speed data processing is desired, the level converters 703, 706 and so on can be omitted, because data distortion occurring during high speed data processing can be corrected by the data converter 702 of the present invention. A distortion occurring during high speed data processing may, for example, be the variation of the pulse width of the PWM signal shown in FIG. 2F from the true width, and the like.

If the level conversion to the ECL level is omitted in the above mentioned manner, the D/A converter 704 and comparator 705 for a signal having the TTL level can be utilized, instead of the same elements for a signal having the ECL level having to be utilized for the level conversion to the ECL level is performed. Regarding the D/A converter 704 and comparator 705, generally the same elements for a signal having the TTL level is considerably less expensive than the same elements for a signal having the ECL level.

Further, the influences of the distortion occurring in the triangular wave generator 711, as shown in FIG. 3B will be corrected by the data converter 702, even if the triangular wave signal generator 711 having lower accuracy may be utilized. Then less expensiveness of the image forming apparatus will be realized, because of the omitting of the conversion to the ECL level is omitted and applying of the triangular wave signal generator having lower accuracy.

Further, in the conventional image forming apparatus, the correction of the distortion of the characteristics regarding the forming of the printed image tone as above mentioned, is performed by a γ correction function in the image processor 600 shown in FIG. 7. However, in the present invention, this correction is performed in the PWM circuit 700. Thus, the correction of the distortions occurring in the PWM circuit, for example, in the triangular wave signal generator 711 or in the image forming system portion 800 is performed by the data converter 702 in the PWM circuit 700. Thus, the system is separated into to parts, one part including the image forming system portion 800, and the other part including the scanner 500 and the image processor 600, so that both of the parts are respectively include the distortion source and the distortion correction means for correcting the distortion occurring therein. Therefore, the investigation of distortions and designing of the correction means becomes easier and, as a result, the reliability of apparatus can be improved.

In the conventional apparatus, if the type of the image forming system portion 800 varies, or if the type of the such image tone forming means as the photosensitive drum 802 and the like varies in a result of, for example, product development, changing the γ correction function in the image processor 600 will be needed. Due to this changing of the γ correction function, changing of the color correction, the tone processing and the like in the image processor 600 will also be needed. Therefore, such changing will become troublesome.

However in the present invention, the system is separated into the two parts, one part including the image forming system portion 800 and the other part including the scanner 500 and the image processor 600. Thus, in the above mentioned cases where the type of system within one part, that is, the image forming system portion 800 is varied, then the changing will be carried out only as regard the function of the data converter 702 in the PWM circuit 700. Thus, such changing as regards the variation of type of the various portions of the apparatus can be simplified.

Further, the data converter according to the present invention is not limited to that utilized for a correction of a distortion included in image forming characteristics as mentioned above, as it can also be utilized for intentionally making image forming characteristics which are desirable from an artistic point of view, for example, to an reverse image tone characteristic, and so on. Also, the data converter may be utilized for converting an image signal describing a color of an image, instead of converting an image signal indicating a tone level of an image.

Further, for example, in the image forming system portion 800, the PWM circuit 700 and the laser driver circuit 707 may consist of one substrate chip of the integrated circuit, so that high speed data processing can be performed in the chip and the apparatus can be less expensive and more reliable because the system is formed in this substrate chip which is solid. In this one chip of the PWM circuit 700 and laser driver circuit 707, the contents of the ROM 750 or ROM 761 shown in FIGS. 10A, 10B, such as the contents of the conversion table shown in FIG. 9 of the data converter 702, may be fixed, so that the apparatus may be even less expensive. Or, of course, the composition wherein the contents of the ROM 750 or 761 are rewritten externally may be applied to the integrated circuit.

This embodiment comprises the duplicator including the scanner 500, the image processor 600 and so on, however, the present invention can also be applied to only a printer such as a laser printer and so on, for example, a printer including only such an image forming system portion such as the image system portion 800 of the embodiment.

Further, the present invention is not limited to these preferred embodiments, and various variations or modifications may be made without departing from the scope of the present invention.

What is claimed is:
1. An image forming apparatus, comprising:
   A) image signal converting means including:
      1) means for converting an input first image signal into a second image signal, wherein:
         1) the first image signal is a multi-tone n-bit digital signal;
         2) the second image signal is a multi-tone m-bit digital signal;
         3) n and m are integers;
         4) m>n; and
         5) the image signal converting means constitutes means for thus forming a first relationship between:
            (1) first image signal values indicated by the first image signal, and
            (2) second image signal values indicated by the second image signal; and
   B) image forming means, having a particular image forming system, for forming a visible image represented by image densities based on the second image signal, to make a second relationship between:
      (1) the second image signal values, and
      (2) the image densities; wherein:
   I) the second relationship is dependent on the particular image forming system; and
   II) the image signal converting means constitutes means for forming the first relationship such that:
   a third relationship of:
      (1) the image densities representing the visible image obtained from the second image signal, and
      (2) the first image signal values, more closely approximates a desired relationship than would a fourth relationship of:
      (1) image densities representing a visible image obtained from the first image signal, and
      (2) the first image signal values.

2. The apparatus of claim 1, wherein: the desired relationship is a linear relationship.

3. The apparatus of claim 2, wherein the second relationship is such that:
   the image densities have a steeper gradient when the second image signal values are smaller according to the second relationship, so that the first relationship is such that the second image signal values have a steeper gradient when the first image signal values are larger.

4. The apparatus of claim 2, wherein:
   a) the image forming system includes an electrophotography system in which:

1) surface electric potentials of a photosensitive element are controlled by the second image signal; and
2) the surface electric potentials then produce the image densities, so that the second relationship is inevitably distorted from linearity so as to form distortion; but wherein:
b) the first relationship acts to cancel the distortion.

5. The apparatus of claim 2, wherein:
a) the image forming system includes a pulse generating means for generating pulses in which:
1) the pulses have widths in proportion to the second image signal values; and
2) the image densities are produced according to the widths of the pulses, so that the second relationship is inevitably distorted from linearity so as to form distortion; but wherein:
b) the first relationship acts to cancel the distortion.

6. An image forming method, comprising:
A) converting an input first image signal into a second image signal, wherein:
1) the first image signal is a multi-tone n-bit digital signal;
2) the second image signal is a multi-tone m-bit digital signal;
3) n and m are integers;
4) m > n; and
5) the converting step constitutes forming a first relationship between:
(1) first image signal values indicated by the first image signal, and
(2) second image signal values indicated by the second image signal; and
B) with a particular image forming system, forming a visible image represented by image densities based on the second image signal, to thus make a second relationship between:
(1) the second image signal values, and
(2) the image densities; wherein:
I) the second relationship is dependent on the particular image forming system; and
II) the converting step includes forming the first relationship such that:

a third relationship of:
(1) the image densities representing the visible image obtained from the second image signal, and
(2) the first image signal values, more closely approximates a desired relationship than would a fourth relationship of:
(1) image densities representing a visible image obtained from the first image signal, and
(2) the first image signal values.

7. The method of claim 6, wherein: the desired relationship is a linear relationship.

8. The method of claim 7, wherein the second relationship is such that:
the image densities have a steeper gradient when the second image signal values are smaller according to the second relationship, so that the first relationship is such that the second image signal values have a steeper gradient when the first image signal values are larger.

9. The method of claim 7, wherein:
a) the forming step includes using an image forming system with an electrophotography system in which:
1) surface electric potentials of a photosensitive element are controlled by the second image signal; and
2) the surface electric potentials then produce the image densities, so that the second relationship is inevitably distorted from linearity so as to form distortion; but wherein:
b) the first relationship acts to cancel the distortion.

10. The method of claim 7, wherein:
a) the forming step includes using an image forming system with a pulse generating means for generating pulses in which:
1) the pulses have widths in proportion to the second image signal values; and
2) the image densities are produced according to the widths of the pulses, so that the second relationship is inevitably distorted from linearity so as to form distortion; but wherein:
b) the first relationship acts to cancel the distortion.

* * * * *